(12) United States Patent
Samih et al.

(10) Patent No.: US 9,418,024 B2
(45) Date of Patent: Aug. 16, 2016

(54) APPARATUS AND METHOD FOR EFFICIENT HANDLING OF CRITICAL CHUNKS

(71) Applicant: INTEL CORPORATION, Santa Clara, CA (US)

(72) Inventors: Ahmad A. Samih, Austin, TX (US); Shadi T. Khasawneh, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 14/039,424

(22) Filed: Sep. 27, 2013

(65) Prior Publication Data

US 2015/0095579 A1  Apr. 2, 2015

(51) Int. Cl.
G06F 12/00 (2006.01)
G06F 13/16 (2006.01)
G06F 12/08 (2016.01)
G06F 9/46 (2006.01)

(52) U.S. Cl.
CPC ........ *G06F 13/16* (2013.01); *G06F 9/46* (2013.01); *G06F 12/0859* (2013.01); *Y02B 60/1225* (2013.01)

(58) Field of Classification Search
None
See application file for complete search history.

(56) References Cited

U.S. PATENT DOCUMENTS 6,757,897 B1 *  6/2004  Shi et al. ............. 718/102
2013/0042252 A1 *  2/2013  Jalal et al. ............ 718/104

* cited by examiner

*Primary Examiner* — Baboucarr Faal
(74) *Attorney, Agent, or Firm* — Nicholson De Vos Webster & Elliott LLP (57) ABSTRACT

An apparatus and method for efficient handling of critical chunks. For example, one embodiment of an apparatus comprises a plurality of agents to perform a respective plurality of data processing functions, at least one of the data processing functions comprising transmitting and receiving chunks of data to and from a memory controller, respectively; a system agent to coordinate requests for transmitting and receiving the chunks of data to and from the memory controller, the system agent comprising: a memory for temporarily storing the chunks of data during transmission between the agents and the memory controller; and scheduling logic to prioritize critical chunks over non-critical chunks across multiple outstanding requests while ensuring that the non-critical chunks do not result in starvation.

16 Claims, 11 Drawing Sheets

APPARATUS AND METHOD FOR EFFICIENT HANDLING OF CRITICAL CHUNKS

BACKGROUND

1. Field of the Invention

This invention relates generally to the field of computer processors. More particularly, relates to an apparatus and method for efficient handling of critical chunks.

2. Description of the Related Art

System-on-Chip (SoC) has become the de-facto hardware architecture across a spectrum of computing platforms including handheld mobile devices, personal computing devices, and even micro-servers. SoC architectures comprise several heterogeneous functional units that are communicatively coupled together such as cores, caches, memory controllers, encoders/decoders, cryptographic engines, cameras, display interfaces, etc.

In order to have a single point of coherence which is visible to all such agents, there usually exists a mediator, sometimes referred to as a "system agent," that caches memory requests internally and once all desired data retirement checks are completed (e.g., coherence is resolved, decryption, etc.), it forwards this data to the requesting agent. For example, if a core makes a request to a 64 Byte request (i.e., two 32 Byte "chunks"), when the data comes back to the system agent from the memory controller, it is stored in the internal cache of the system agent. Once cleared for forwarding (i.e., globally visible in terms of coherence), the system agent prioritizes the forwarding of the critical chunk over the non-critical chunk within a single request.

If there exists multiple blocks cached in the system agent, there is no existing mechanism to prioritize critical chunks across multiple requests (i.e., the system agent might send a non-critical chunk of an old request over the critical chunk of a new request). This, therefore, can lead to suboptimal performance as the critical chunks of some tailing blocks have to wait for non-critical chunks of preceding blocks for non-streaming workloads and those accessing partial blocks only.

Another situation in which this poses a problem is memory scheduling where the system agent schedules requests to a memory controller that may have a width of one chunk (e.g., 32 Bytes). In such a case, traditionally, the system agent would schedule the critical chunk over the non-critical chunk within a single request. However, this could as well lead to suboptimal performance if there are many younger critical chunks awaiting scheduling.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments described below. It will be apparent, however, to one skilled in the art that the embodiments of may be practiced without some of these specific details. In other instances, well-known structures and devices are shown in block diagram form to avoid obscuring the underlying principles of the embodiments.

Exemplary Processor Architectures and Data Types

Figure 1A:
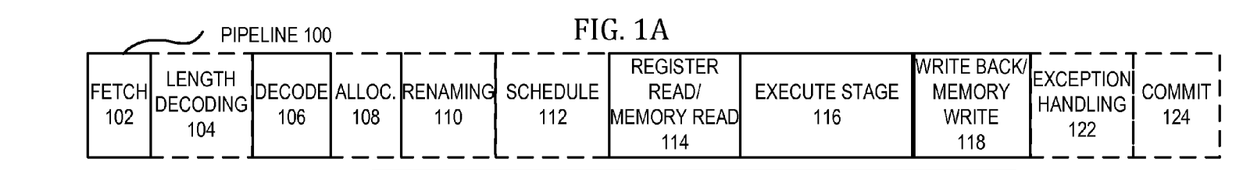
FIG. 1A is a block diagram illustrating both an exemplary in-order pipeline and an exemplary register renaming, out-of-order issue/execution pipeline according to embodiments.
Figure 1B:
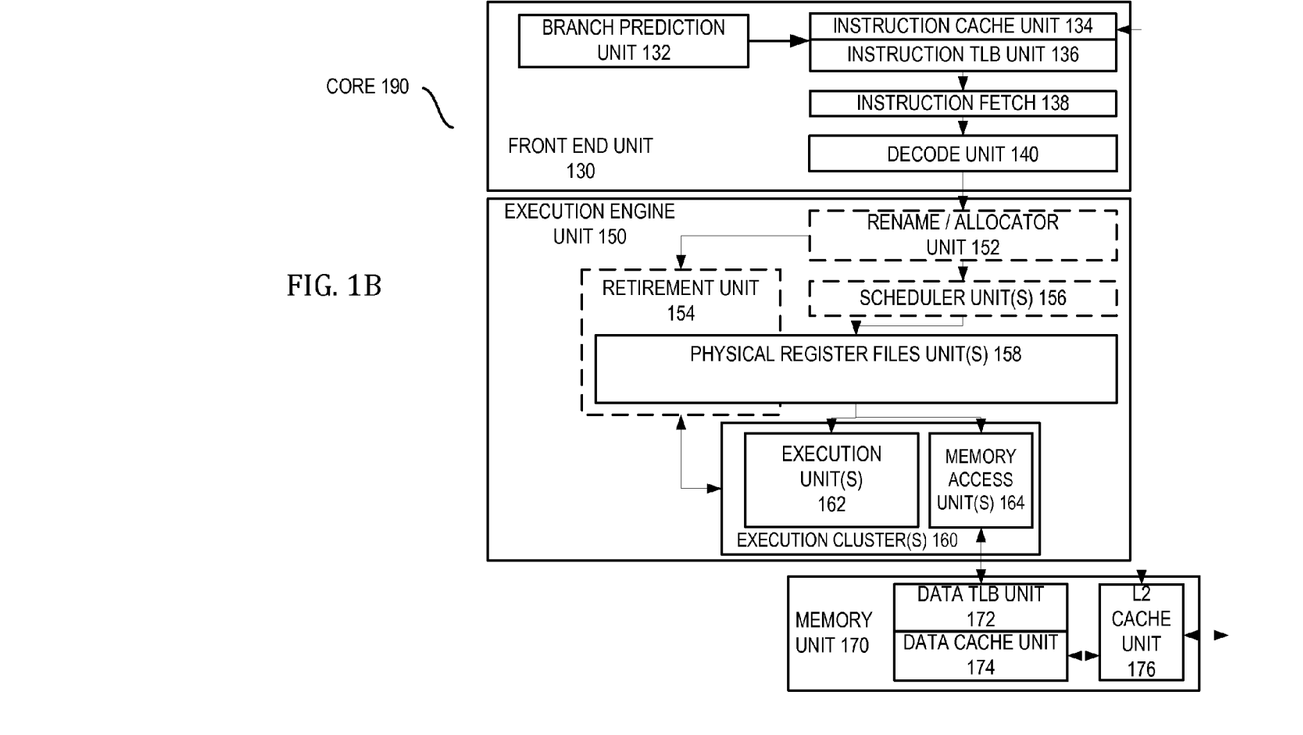
FIG. 1B is a block diagram illustrating both an exemplary embodiment of an in-order architecture core and an exemplary register renaming, out-of-order issue/execution architecture core to be included in a processor according to embodiments.

FIG. 1A is a block diagram illustrating both an exemplary in-order pipeline and an exemplary register renaming, out-of-order issue/execution pipeline according to embodiments. FIG. 1B is a block diagram illustrating both an exemplary embodiment of an in-order architecture core and an exemplary register renaming, out-of-order issue/execution architecture core to be included in a processor according to embodiments. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
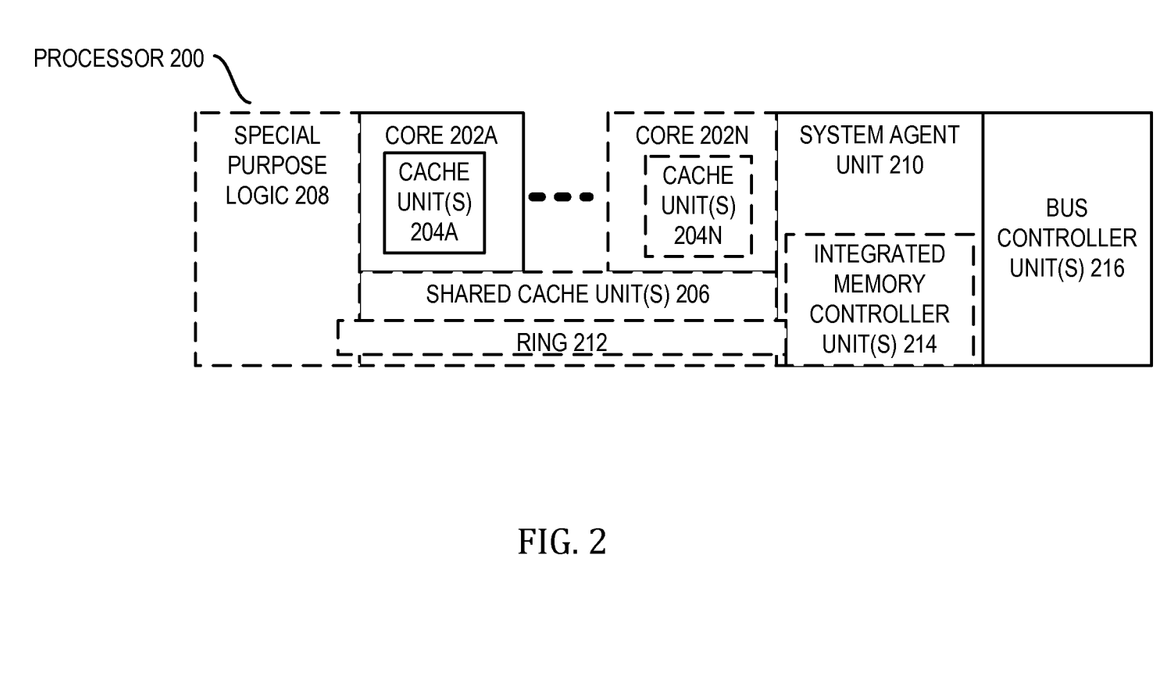
FIG. 2 is a block diagram of a single core processor and a multicore processor with integrated memory controller and graphics according to embodiments.

FIG. 2 is a block diagram of a processor 200 that may have more than one core, may have an integrated memory controller, and may have integrated graphics according to embodiments. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
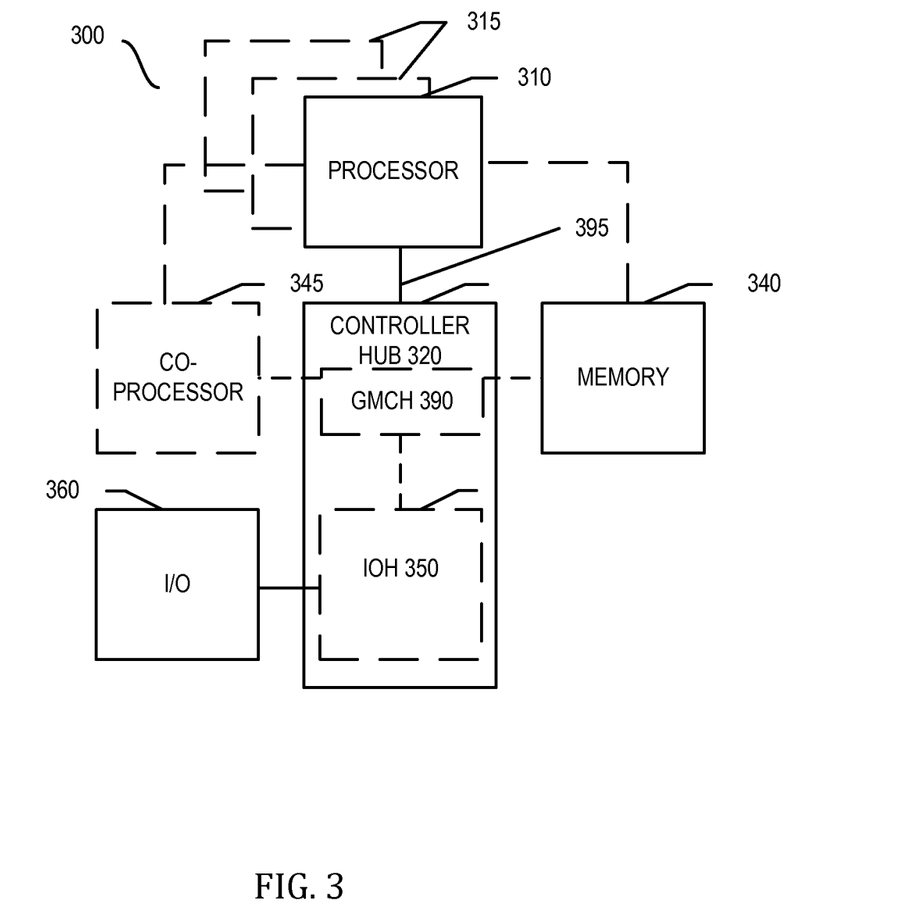
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
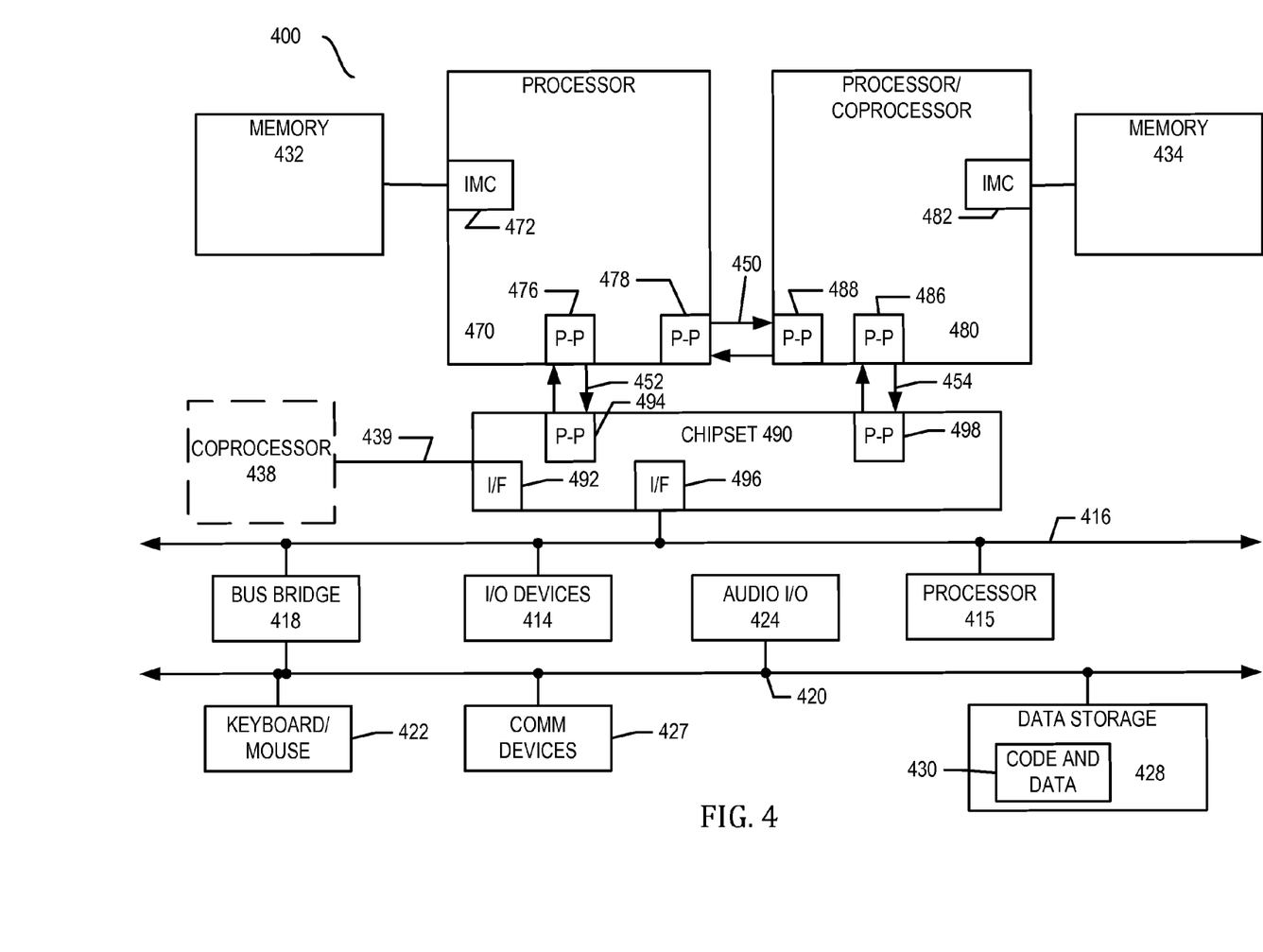
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
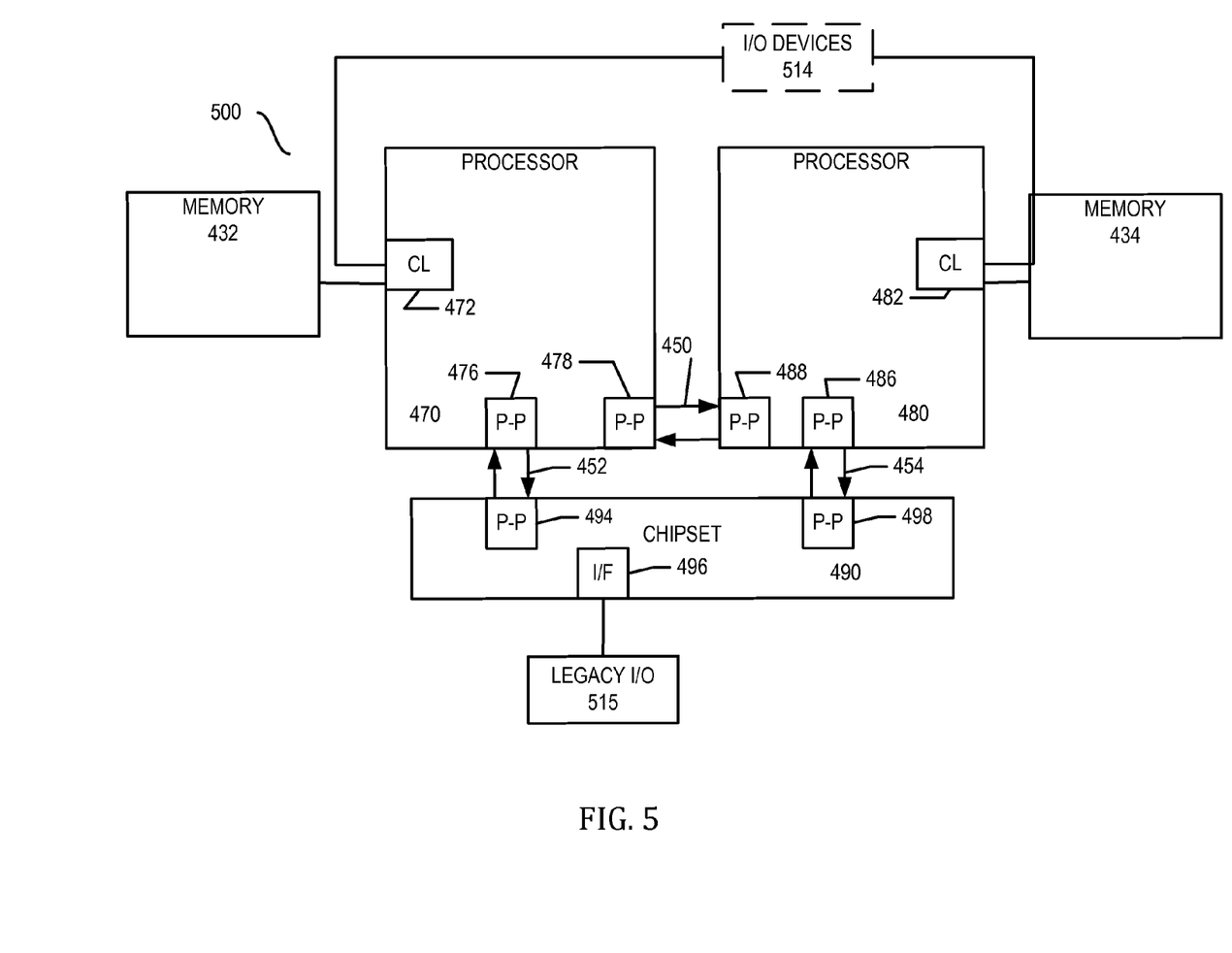
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
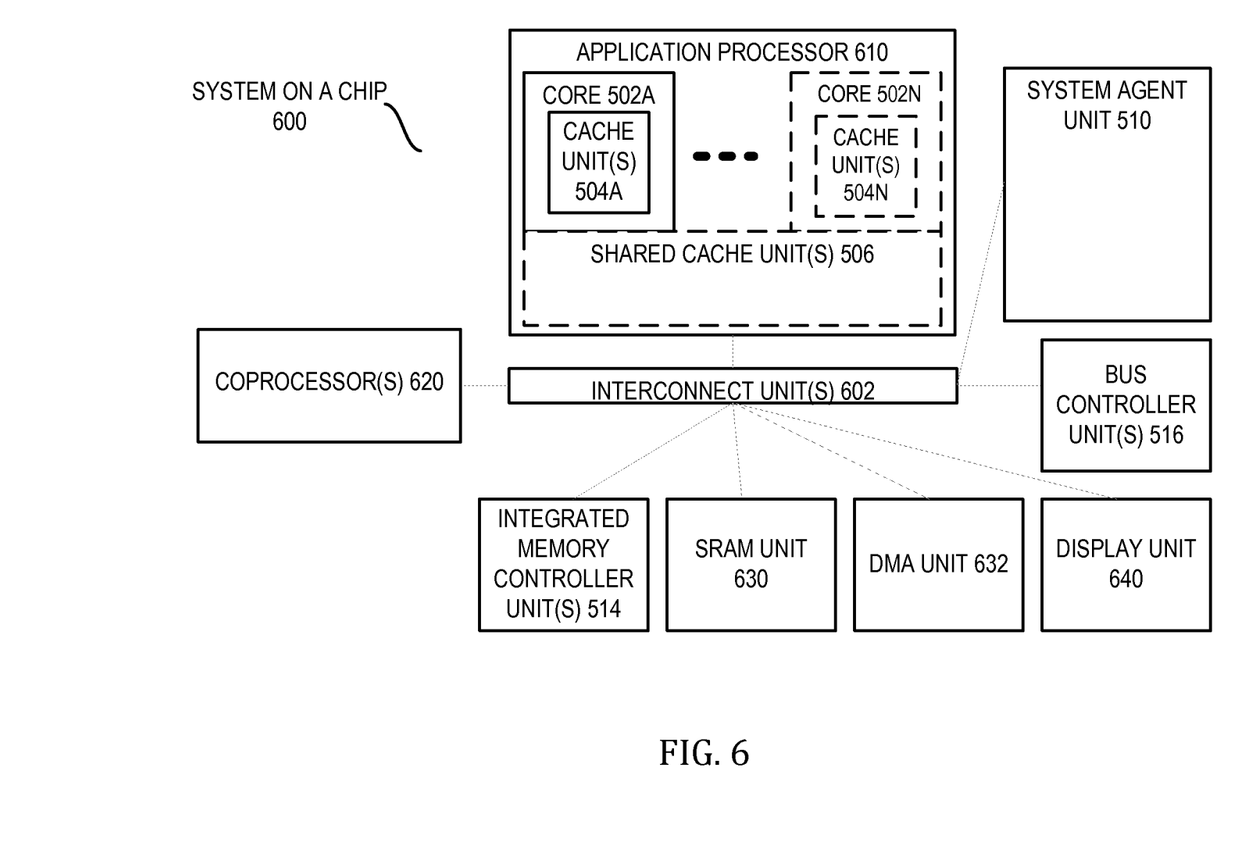
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
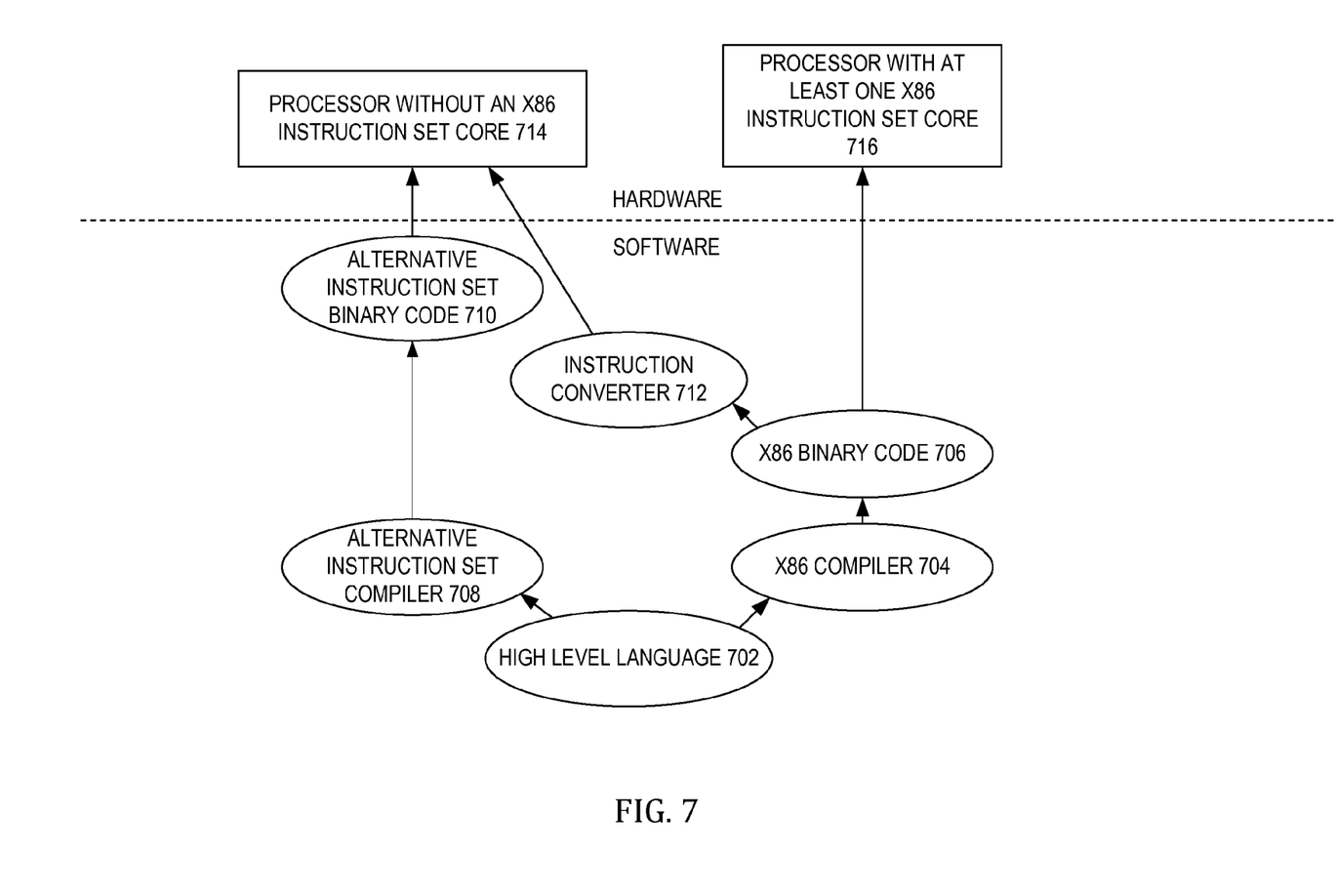
FIG. 7 illustrates a block diagram contrasting the use of a software instruction converter to convert binary instructions in a source instruction set to binary instructions in a target instruction set according to embodiments.

FIG. 7 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Efficient Handling of Critical Chunks

As mentioned, in traditional system-on-a-chip (SoC) architectures, the system agent prioritizes critical chunks over non-critical chunk within the same request but not across many requests. Once a request is selected for scheduling or retirement, the system agent schedules or retires all chunks within that request before switching to another request. This is based on the premise that applications are streaming over data. However, this is not the case across all workloads; some workloads do not stream over data, while others only access partial data (e.g., one chunk only).

In such cases, there may be more than one block in the system agent that is awaiting scheduling or forwarding. Prioritizing critical chunks within only a single request can have a significant performance impact on the load-to-use latency as some critical chunks would have to wait for both leading critical chunks and non-critical chunks to be forwarded to their requestors (or scheduled to memory).

To address this inefficiency, one embodiment prioritizes all critical chunks of available requests over non-critical chunks as long as the non-critical chunks do not starve or otherwise experience long delays. This effectively reduces the load-to-use latency and reduces the core C0 residency, as the requesting cores get the requested data much faster, leading to higher performance and energy savings.

Figure 8A:
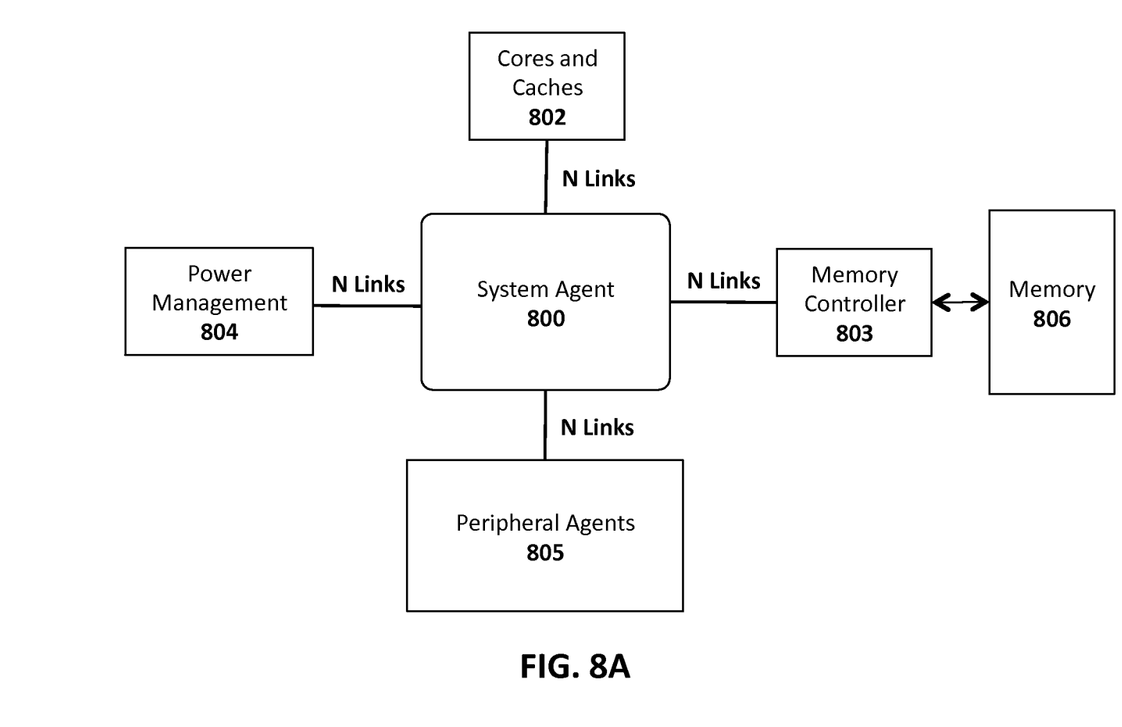
FIGS. 8A-B illustrate an architecture employed in one embodiment.
Figure 8B:
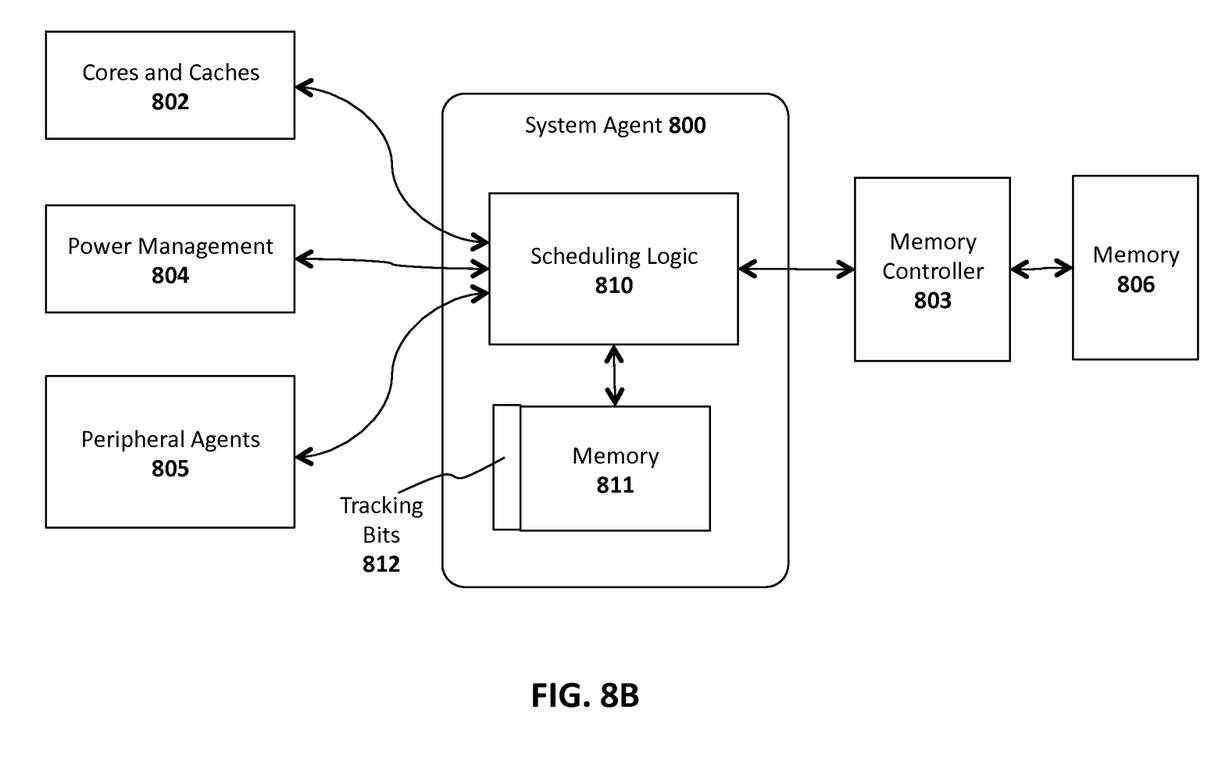

FIG. 8A illustrates an exemplary set of functional units within a generic system architecture (such as a SoC architecture) including cores and caches 802; a memory controller 803 which provides connectivity to the main memory 806; peripherals agents 805 for devices such as, for example, a Display and Camera; and a power management unit 804. All of these units interact and communicate with each other (e.g., request and transmit data) through a system agent 800. If, for example, the core 802 initiates a read transaction that misses its caches, the transaction is propagated down to scheduling logic 810 within the system agent 800 (as shown in FIG. 8B) which then forwards the request to the memory controller 803. The memory controller 803 then retrieves the data from the main memory 806 (e.g., a dynamic random access memory (DRAM)) and the scheduling logic 810 caches/buffers the data within a local memory 811 (e.g., a buffer, cache, etc) until cleared from a coherence point of view and other data retirement checks are complete. The scheduling logic 810 then sends the data to the requesting core.

If multiple blocks stored in the system agent memory 811 that belong to a non-streaming application or application that touches partial blocks, and those blocks are awaiting scheduling to the memory controller 803 or awaiting forwarding to requesting agents 803, 804, 805, one embodiment of the scheduling logic 810 prioritizes the critical chunks across all of these requests over their non-critical chunks, while at the same time guaranteeing that non-critical chunks do not run into starvation and experience long delays.

In one embodiment, the scheduling logic 810 maintains a pair of tracking bits 812 for each request to provide fine-grained tracking of data sent to requesting agents. For example, two tracking bits may be added per each pending transaction. Each bit keeps track of whether a half chunk has been forwarded or not. By doing so, the scheduling logic 810 can detect which chunks are sent, which chunks are not, and when a tracking entry is to be de-allocated. If the bus interface supports chunk interleaving (chunks being sent out of order such as with quick path interconnect (QPI)) and if the system agent 800 already utilizes that feature, then those bits would be present already. In case this feature is not already supported, an additional 1 bit per request may be added as the other bit already exists.

Figure 9:
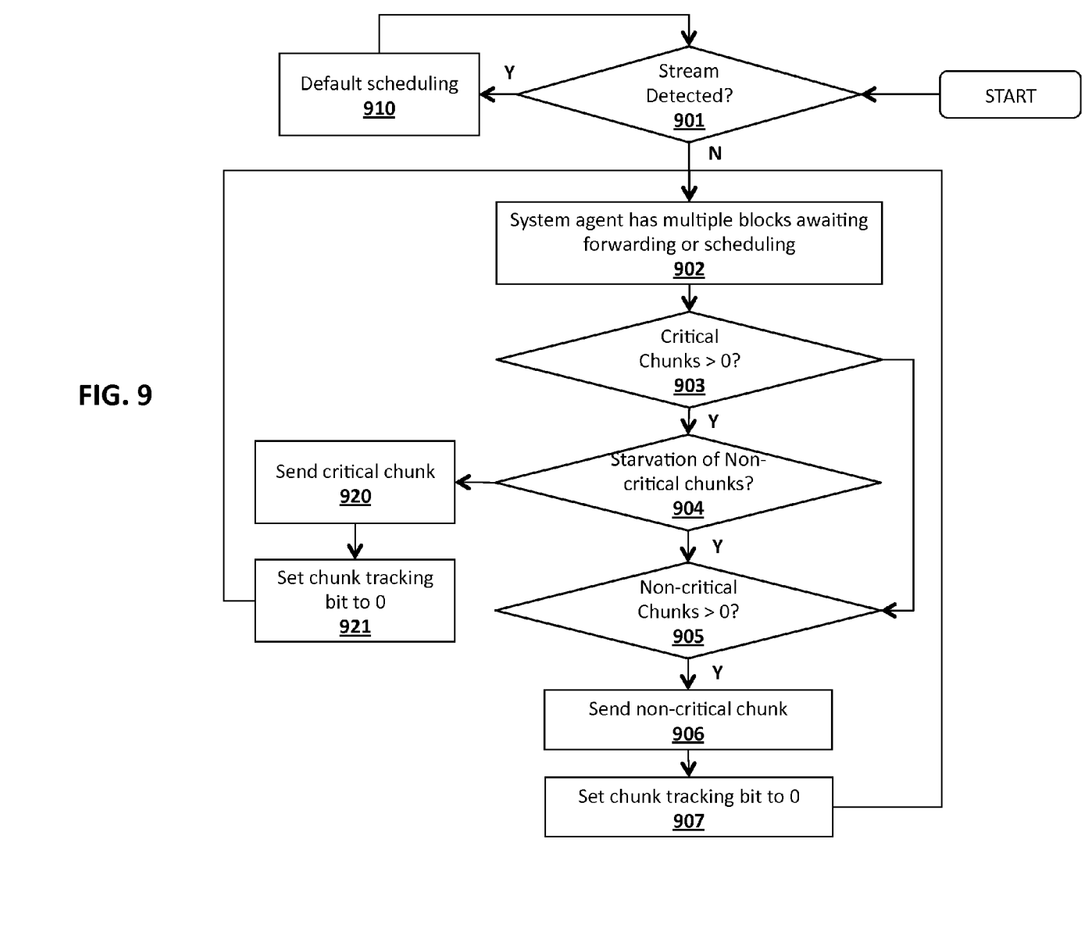
FIG. 9 illustrates a method in accordance with one embodiment.

One embodiment of a method to implement efficient critical chunk forwarding is illustrated in FIG. 9. In one embodiment, the method set forth in FIG. 9 is executed by the system agent scheduling logic 810 of FIG. 8B. However, the illustrated method may be implemented within any system architecture while still complying with the underlying principles.

At 901, a determination is made as to whether the requests coming out of the application are non-streaming or accessing partial blocks. If not, then default scheduling is employed at 910 (e.g., sending both critical and non-critical chunks of a first request ahead of at least some critical chunks of another request). If, however, the requests coming out of the application are non-streaming or accessing partial blocks, then the scheduling logic 810 may send critical chunks until a starvation measure kicks in and then send non-critical chunks.

Specifically, at 902, the scheduling logic 810 includes multiple blocks stored in its memory 811 which are awaiting forwarding or scheduling. If critical chunks are stored in the memory 811, determined at 903, then at 904, a determination is made as to whether non-critical chunk processing is being starved for data at 904. In one embodiment, a starvation measure is implemented based on the age of the requests. For example, an older non-critical chunk can be delayed by a certain, specified number of younger critical chunks. Alternatively, the older non-critical chunks may be delayed by a specified amount of time as critical chunks are processed.

If starvation is not detected, then at 920, the critical chunk is transmitted and at 921 the chunk tracking bit for that chunk is set equal to 0 (to indicate that the critical chunk has been sent). The process then returns to 902.

If starvation of non-critical chunks is detected at 904 (or if there are no critical chunks at 903), then at 905 a determination is made as to whether any non-critical chunks need to be processed. If so, then at 906, the noncritical chunk is sent and, at 907, the chunk tracking bit for the non-critical chunk is set to 0 (to indicate that the non-critical chunk has been sent). The process then returns to 902.

In one embodiment, if the requesting agent is a cache controller, it keeps track of which chunks it has received and which ones are yet to be received. That is, the cache controller keeps track of all outstanding misses for which the data needs to be returned from the system agent (e.g., because it cannot install the data in the cache unless it has received both chunks).

Figure 10:
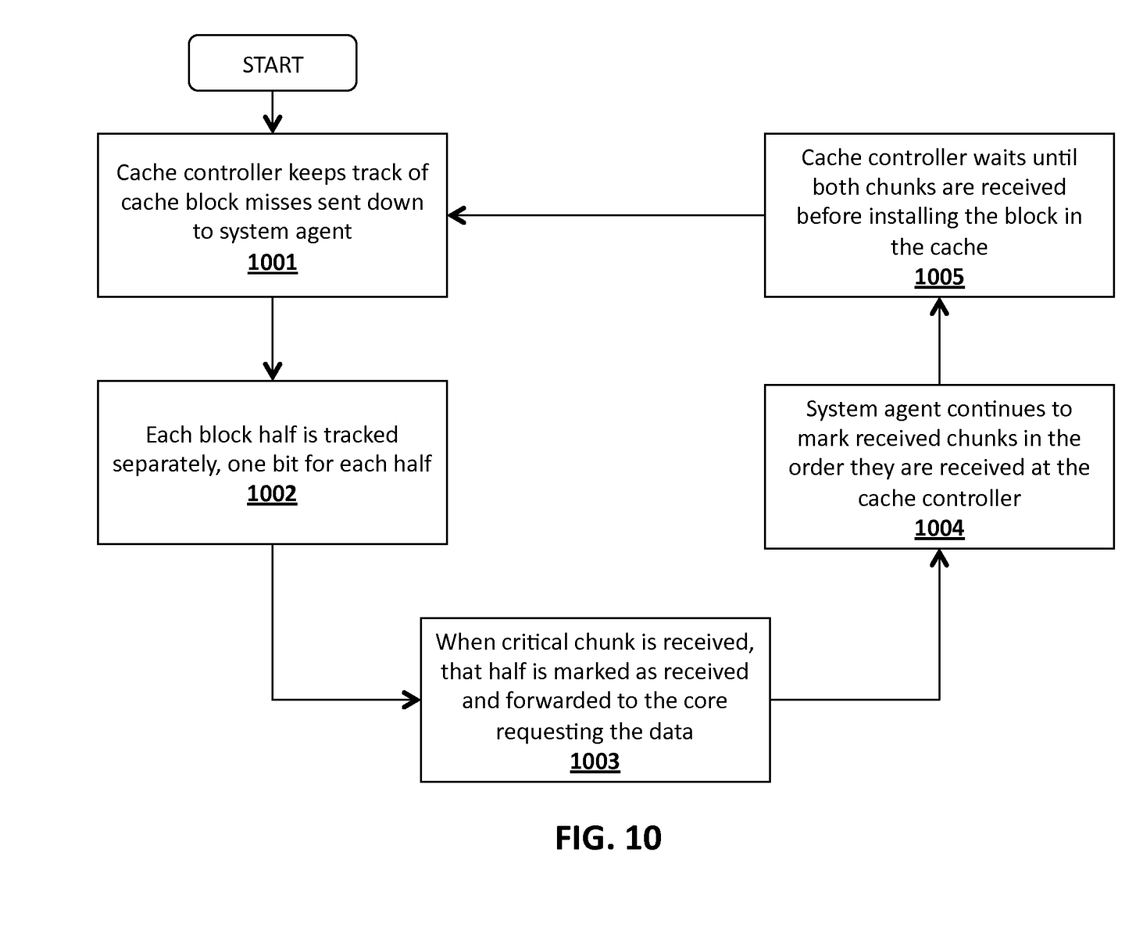
FIG. 10 illustrates a method in accordance with another embodiment.

FIG. 10 illustrates a method implemented by a cache controller. At 1001, the cache controller keeps track of cache block misses sent to the system agent. As indicated in 1002, the cache controller may track each block half separately. For example, a bit may be set for each half to indicate whether it has been received. At 1003, when a critical chunk is received by the cache controller the bit associated with that half is set (to indicate that it has been received) and the critical chunk is forwarded to the core which requested the data. At 1004, the scheduling logic of the system agent continues to mark received chunks in the order they are received at the cache controller. At 1005, the cache controller waits until both chunks are received before installing the block in the cache.

Note that, although this embodiment is described with respect to data transactions from and to one of the cores, the same concept can be similarly applied to various other agents in the system architecture in a similar fashion. The underlying principles are not limited to requests from any particular type of agent.

Embodiments may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that may be practiced without some of these specific details. In certain instances, well known structures and functions were not described in elaborate detail in order to avoid obscuring the subject matter of the present invention. Accordingly, the scope and spirit should be judged in terms of the claims which follow.

What is claimed is:

1. An apparatus comprising:
   a plurality of agents to perform a respective plurality of data processing functions, at least one of the data processing functions comprising transmitting and receiving chunks of data to and from a memory controller, respectively;
   a system agent to coordinate requests for transmitting and receiving the chunks of data to and from the memory controller, the system agent comprising:
   a memory for temporarily storing the chunks of data during transmission between the agents and the memory controller; and
   scheduling logic to:
      prioritize critical chunks over non-critical chunks across multiple outstanding requests while ensuring that the non-critical chunks do not result in starvation; and
      maintain a pair of tracking bits for each request to provide fine-grained tracking of data sent to requesting agents, wherein each bit is associated with a half chunk and wherein the scheduling logic uses each bit to track whether a half of the chunk has been forwarded or not.

2. The apparatus as in claim 1 wherein the plurality of agents include a cache controller.

3. The apparatus as in claim 2 wherein the cache controller keeps track of all outstanding misses for which a chunk needs to be returned from the system agent.

4. The apparatus as in claim 3 wherein the cache controller waits until all chunks associated with a request are received before installing the block comprising the chunks in the cache.

5. The apparatus as in claim 1 wherein the plurality of agents include a power management unit.

6. The apparatus as in claim 1 wherein the plurality of agents include one or more peripheral agents.

7. The apparatus as in claim 1 wherein the system agent uses the bit values to determine whether a tracking entry in the memory is to be de-allocated.

8. The apparatus as in claim 1 wherein the scheduling logic modifies a tracking bit value for a half chunk transmitting the half chunk to a requesting agent.

9. The apparatus as in claim 1 wherein the scheduling logic first determines whether multiple blocks exist in the memory that belong to a non-streaming application or an application that touches partial blocks and, if so, then performing the prioritization of the critical chunks if those blocks are awaiting scheduling to the memory controller or awaiting forwarding to requesting agents.

10. A method comprising:
performing a plurality of data processing functions on a respective plurality of agents, at least one of the data processing functions comprising transmitting and receiving chunks of data to and from a memory controller, respectively;
coordinating requests for transmitting and receiving the chunks of data to and from the memory controller at a system agent, the system agent performing the additional operations of:
temporarily storing the chunks of data in a memory during transmission between the agents and the memory controller;
prioritizing critical chunks over non-critical chunks across multiple outstanding requests while ensuring that the non-critical chunks do not result in starvation; and
maintaining a pair of tracking bits for each request to provide fine-grained tracking of data sent to requesting agents, wherein each bit is associated with a half chunk and wherein the scheduling logic uses each bit to track whether a half of the chunk has been forwarded or not.

11. The method as in claim 10 wherein the plurality of agents include a cache controller.

12. The method as in claim 10 wherein the plurality of agents include a power management unit.

13. The method as in claim 10 wherein the plurality of agents include one or more peripheral agents.

14. The method as in claim 10 wherein the system agent uses the bit values to determine whether a tracking entry in the memory is to be de-allocated.

15. The method as in claim 10 wherein the system agent modifies a tracking bit value for a half chunk transmitting the half chunk to a requesting agent.

16. The method as in claim 10 wherein the system agent first determines whether multiple blocks exist in the memory that belong to a non-streaming application or an application that touches partial blocks and, if so, then performing the prioritization of the critical chunks if those blocks are awaiting scheduling to the memory controller or awaiting forwarding to requesting agents.

* * * * *